S. R. BUSH.
Bag-Fasteners.

No. 144,738. Patented Nov. 18, 1873.

Witnesses:
Henry N. Miller
C. L. Evert

Inventor.
Seth R. Bush,
per Skander Thiison
Attorneys.

UNITED STATES PATENT OFFICE.

SETH R. BUSH, OF BUSH'S MILL, OHIO.

IMPROVEMENT IN BAG-FASTENERS.

Specification forming part of Letters Patent No. 144,738, dated November 18, 1873; application filed October 23, 1873.

*To all whom it may concern:*

Be it known that I, S. R. BUSH, of Bush's Mill, in the county of Gallia and in the State of Ohio, have invented certain new and useful Improvements in Bag-Tie; and do hereby declare that the following is a full, clear, and exact description thereof, reference being had to the accompanying drawings, and to the letters of reference marked thereon, making a part of this specification.

The nature of my invention consists in a perforated plate and a hook connected by an open link, which is attached to a sack, for the purpose of fastening the mouth of the sack, as will be hereinafter more fully set forth.

In order to enable others skilled in the art to which my invention appertains to make and use the same, I will now proceed to describe its construction and operation, referring to the annexed drawing, in which—

Figure 1:
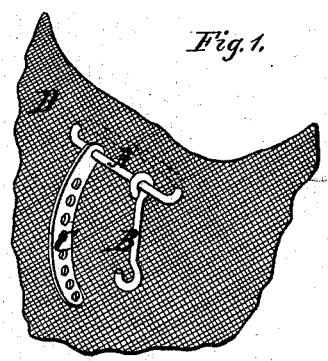
Figure 2:
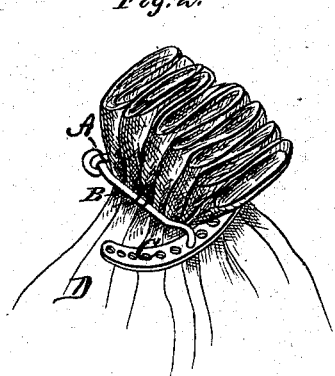
Figure 3:
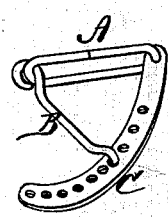

Figure 1 is a perspective view of a part of a grain or flour sack with my tie attached to the same, open. Fig. 2 is a perspective view, showing the tie closed around the mouth of the sack; and Fig. 3 is a perspective view of the bag-tie.

A represents an open link, on which are placed a hook, B, and a perforated plate, C.

The ends of the open link A are passed from the outside through the bag or sack D, after which the link is closed. The hook B is then pressed against the sack and fastened by hooking into the plate at any point desired. The hook and plate, being attached to the link in the manner shown, form a part of a circle, and make a very simple and convenient arrangement for the purposes intended.

It is fastened and unfastened by turning or rolling the plate on and off the hook, by holding the loose end of the plate between the thumb and forefinger of the right hand.

This bag-tie is simple, cheap, and durable, and easily fastened and unfastened; and when fastened it cannot come undone.

Having thus fully described my invention, what I claim as new, and desire to secure by Letters Patent, is—

The combination of the open link A, hook B, and perforated plate C, for the purposes herein set forth.

In testimony that I claim the foregoing I have hereunto set my hand this 29th day of September, 1873.

SETH R. BUSH.

Witnesses:
P. H. GASKIN,
J. H. CAMPBELL.